United States Patent [19]

Merz

[11] Patent Number: 4,516,784
[45] Date of Patent: May 14, 1985

[54] SEAL ASSEMBLY WITH RADIALLY UNDULATED SEALING ELEMENT

[75] Inventor: Johann Merz, Schwäbisch Gmünd, Fed. Rep. of Germany

[73] Assignee: Zahnradfabrik Friedrichshafen AG, Friedrichshafen, Fed. Rep. of Germany

[21] Appl. No.: 639,209

[22] Filed: Aug. 9, 1984

[30] Foreign Application Priority Data

Aug. 27, 1983 [WO] PCT Int'l Appl. .................. PCT/EP83/00226

[51] Int. Cl.$^3$ ............................................... F16J 15/12
[52] U.S. Cl. .................... 277/180; 277/204; 277/235 B
[58] Field of Search ............... 277/180, 200, 203, 204, 277/213, 235 B

[56] References Cited

U.S. PATENT DOCUMENTS

| | | | |
|---|---|---|---|
| 3,279,805 | 10/1966 | Quinson | 277/180 X |
| 3,342,501 | 9/1967 | Meyer | 277/180 |

FOREIGN PATENT DOCUMENTS

| | | | |
|---|---|---|---|
| 1094659 | 12/1954 | France | 277/235 B |
| 1134096 | 11/1968 | United Kingdom | 277/180 |
| 1389010 | 4/1975 | United Kingdom | 277/235 B |
| 1541690 | 3/1979 | United Kingdom | 277/235 B |

Primary Examiner—Robert S. Ward
Attorney, Agent, or Firm—Zalkind & Shuster

[57] ABSTRACT

A seal assembly comprised of a pair of concentric rings radially spaced with a tortuous or convoluted channel therebetween in which is carried a rubber-like compressible seal element that extends beyond the radial surfaces of the rings. The inner ring has passages for flow between registering passages of assembled components, e.g., radial piston pumps. Such passages are inside the perimeter of the seal element and within convolutions. The outer ring has apertures for passage of screws for assembling the components together, thereby compressing the sealing element during assembly to effect a tight seal. The compressed material is displaced into adjoining concavities molded into the sealing element within the thickness of the concentric carrier rings.

9 Claims, 3 Drawing Figures

SEAL ASSEMBLY WITH RADIALLY UNDULATED SEALING ELEMENT

BACKGROUND OF THE INVENTION

It has heretofore been known to provide a seal assembly comprising a seal element carried between two concentric metal rings wherein the seal element extends beyond the ring surface on both sides. Such seal element has consisted of a spirally wound toroid of seal material which is axially corrugated. Such an assembly is shown in a brochure of the firm KSA Dichtungssysteme GmbH and Co., of W. Germany. The brochure is entitled "Sealing Precision—The Concept from One Hand" and contains diagrams of a "Series MD 6000" which illustrates and briefly describes the above combination. It has likewise been known to provide a seal assembly, shown in the same brochure as "Series GM 4000", consisting of a sheet metal ring having a concentric groove on each side with a rubber ring sealing element or gasket vulcanized in each groove. These elements have a ridge axially beyond the radial side surfaces of the ring and depressions into which the ridges are forced when the seal assembly is compressed between opposed surfaces of assembled components.

BRIEF DESCRIPTION OF THE INVENTION

The prior art has certain drawbacks in that the spirally wound toroid is limited to cases of use where the area to be sealed can be properly sealed by a circular seal. Further, it is not possible to properly measure the compression induced in the seal by assembly of components on each side because there is no vacant space provided into which the seal material can be compressed within the confines of the thickness of the carrying rings. Accordingly, alignment faults can occur when using components screwed or bolted together. Additionally, where high pressures are involved sealing problems may occur. Also, such seals are relatively expensive.

The present invention eliminates these drawbacks by providing a convoluted or undulating sealing ring so fashioned that passages registering between assembled components which are to be sealed against leakage are within loops or undulations of a sealing ring so that individual sealing to a large extent can be effected. On the other hand, the prior art arrangements wherein a sheet metal ring is provided with a concentric groove on each side in which is vulcanized a rubber gasket there is the expense of vulcanization on two sides of the ring and thus relatively high production costs. Further, due to the fact that the grooves are fairly shallow recesses, only a limited space in which to displace the compressed ribs or ridges of the extending portion of the seal is provided. Thus, the amount of material that can actually be used for the purposes of being compressed to form a tight seal is limited. The present invention overcomes the drawback just described by providing a seal of material disposed entirely through the thickness of the carrying rings. Accordingly, the space to take the displacement of the extending portions of the sealing ring can be made larger and therefore the compressed portion larger accordingly.

Thus, by making a seal assembly comprised of inner and outer carrying rings radially spaced to effect a convoluted channel has the advantage of providing for a certain perimeter of sealing for individual passages but can take advantage of a crest and valley design for the sealing material contour which effects a better seal by way of greater compression during assembly of the components having registering passages which are to be sealed.

The particular arrangement provides for a compression stress on the sealed material limited by the thickness of the carrying rings so that the sealing material is not subjected to any undesired stress. The carrying rings may be simply stamped parts and the sealing material such as rubber or the like molded between the rings in the convoluted channel in accordance with methods well known. The particular seal assembly herein described is especially suitable for sealing registering pressure channels of the components of a radial piston pump. Thus, in a radial piston pump the major components are the pump housing and the pulsator outlet chamber for the outlet pressures of the several piston chambers in the pump body. Thus, each component has certain passages which must register with passages of the other component and when the components are screwed or bolted together the passages must be well sealed. This has heretofore been done by individual "O" rings in grooves for each sequence of registering passages. Such arrangements, however, were relatively expensive compared to the present invention and occasionally leakage could develop due to inadvertent omission of a single "O" ring. Such drawbacks are clearly overcome by the present invention in the use of a continuous ring of convoluted contour wherein each sequence of registering passages is looped by sealing material effecting an interface and all such passages are within the interior of the convoluted ring. Thus, the inner carrying ring is provided with passages that register with the registering passages of the pump components. On the other hand, the exterior carrying ring is provided with apertures through which assembled bolts or screws may be set for screwing the pump components together and which latter passages need not be sealed and are exterior of this convoluted sealing ring.

A detailed description of the invention follows in conjunction with the appended drawing in which.

Figure 1:
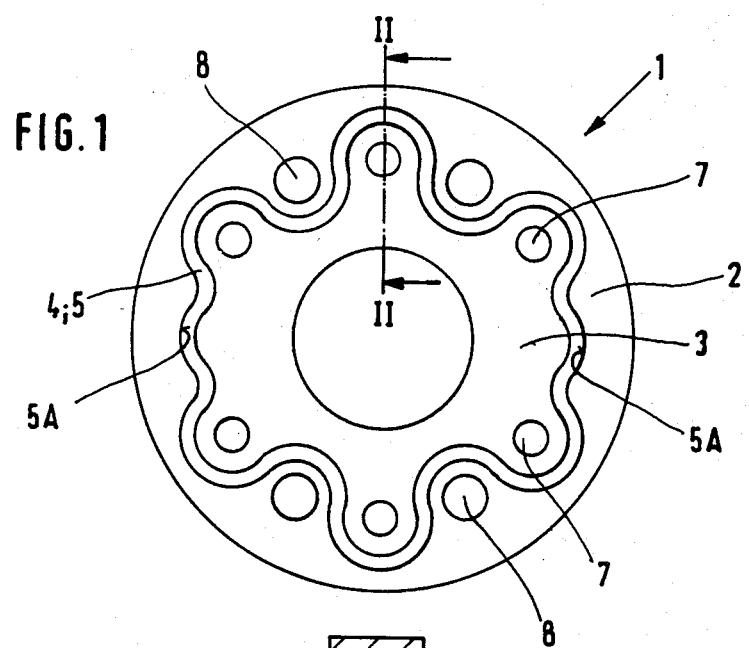
FIG. 1 is a plan view of the seal assembly.
Figure 2:
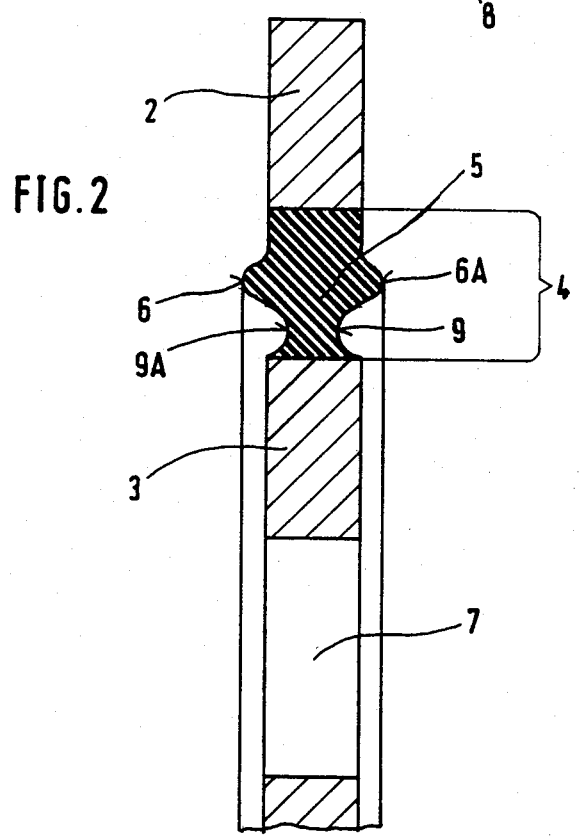
FIG. 2 is an enlarged section on line II—II of FIG. 1.

Referring to FIGS. 1 and 2, the seal assembly 1 comprises means, e.g., rings 2 and 3 which may be stamped sheet metal, the rings being concentric, there being an outer ring 3 and an inner ring 2, radially spaced so as to effect a channel 4 therebetween. The rings are carrier or confining rings for a sealing material. The channel is convoluted or undulated as shown, having radially convex portions in the outer ring 2 and radially concave portions in the inner ring 3. The channel holds a sealing element of compressible material such as a sealing ring 5 of rubber vulcanized in place.

The sealing ring 5 fills channel 4 and extends axially outward of the thickness of the carrier rings at each side, with a rib or crest 6, 6A, which are enlarged portions beyond the side radial surfaces of the rings which are of equal thickness. Thus, sealing ring 5 which may be molded into place between the carrier rings is formed on the mold with the same undulating contour as channel 4, and with a continuous cross-section of the extending convexities or crests 6, 6A together with adjoining depressions, i.e., concavities or valleys 9, 9A which effect hollows below the faces of the carrier rings, within the thickness thereof. The valleys adjoin the crests and are for the purpose of accomodating displacement of the compressed material of the crests under assembly pressure between components having registering passages to be circumferentially sealed by the seal assembly of the invention as an interface therebetween.

Thus, upon compression between opposed surfaces of assembled components, the sealing material is compressed into the planes of the carrier rings.

For such purpose the inner carrier ring 3 is provided with flow passage apertures 7 that align with respective registering passages of assembled components, thus a sequence of passages for flow from one component to another has an aperture 7 for connection therebetween, as will be apparent from FIG. 3, to be later described.

In particular, it should be noted that the apertures 7 are within the confines of the continuous sealing ring 5, having a loop of convoluted shape radially convex and embracing respective apertures 7. Thus, the passage connections are well sealed exteriorly.

The outer carrier ring 2 has bores or apertures 8 for passage of screws or bolts to secure components in assembly. Such bores are for compactness located peripherally close to passages 7 and the radially concave convolutions of the sealing ring 5 embrace them.

Accordingly, the unique shape of the sealing ring 5 permits an assembly of components to be of compact design.

Figure 3:
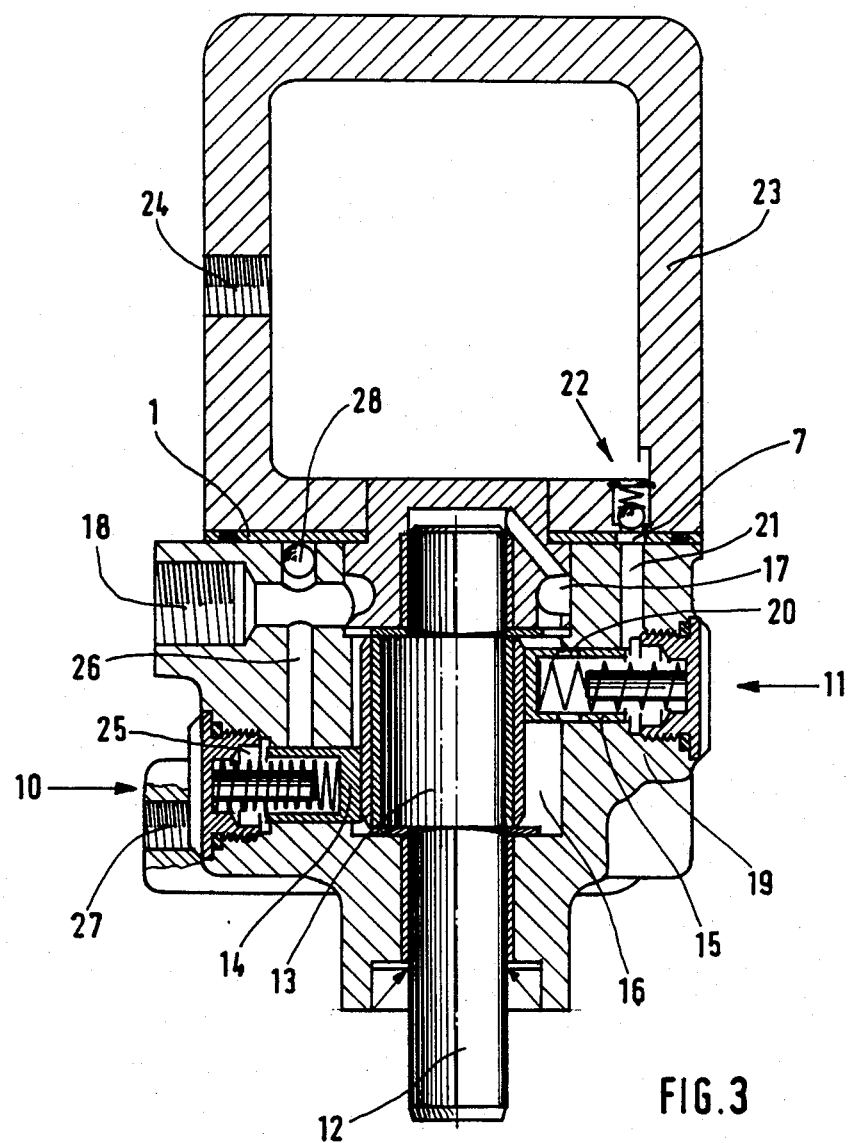
FIG. 3 is a longitudinal section of a multipiston radial pump utilizing the seal assembly.

Referring now to FIG. 3, a radial piston pump is shown having the seal assembly 1 of the invention, and for which the invention is particularly advantageous.

In this instance, a radial piston pump supplies two oil circuits, one of which is connected to a two-cylinder pump 10 and the other circuit to a six-cylinder pump 11, all within the pump housing. A drive shaft 12 carries a cam 13 which operates the two pistons 14 of the pump 10 as well as the six pistons 15 of the pump 11. The cam 13 rotates in a cam chamber 16 which is connected with an intake 18 by way of annular groove 17. Each of the six pistons 15 sucks the pressure oil from the cam chamber via inlet passages 20 and pumps it via a pressure duct 21 and a respective outlet valve 22 into the pulsator chamber 23. Flow connects, as will be understood, via an outlet 24 with a consumer device, not shown. The pulsator chamber 23 is conventional for smoothing out the pressure pulsations occurring in the pump 11, which pulsations otherwise could possible cause roughness of system operation. The two pistons 14 of the pump 10 suck in pressure oil via respective chambers 25 adjacent the pistons 14, during the suction strokes, via suction duct 26 having the intake 18. An outlet 27 of pump 10 is connected with an additional consumer device.

The preceding description is of a conventional pump, except that the seal assembly 1 of the invention is shown as an interface between the pump housing 19 and the pulsator chamber 23 with the apertures 7 aligned with the outlet pressure ducts 21. The crests 6, 6A are of sufficiently soft material so as to be compressed during pump housing assembly to the pulsator chamber 23, for spreading into the valleys 9A, 9, respectively. Thus, the crests 6, 6A are flattened into the thickness of the rings 2 and 3 and, under such compression, elastically seal the pulsator chamber and pump housing in assembly and the several passages and components therein against leakage effective against high pressures.

The arrangement provides for considerable compression of the sealing material to effect a tight seal around the flow passages for high pressures. Also, the suction ducts 26 with their respective ball valves 28 for pump 10 are advantageously enclosed within the sealing ring 5 by the radially convex convolutions 5A.

I claim:

1. A seal assembly for sealing registering flow passages (21, 22) of assembled components (18, 23) and wherein said seal assembly comprises a pair of carrier rings with radial spacing therebetween for carrying a sealing element of compressible material in said spacing, wherein said sealing element extends axially beyond the thickness of said carrier rings;
one said ring (3) having flow passage apertures (7) for registering, respectively, with said flow passages of said assembled components and the other said ring (2) having assembly screw bores (8) therethrough for accommodating assembly screws securing said assembled components together;
the improvement wherein:
said sealing element comprises a sealing ring radially undulated to continuously wind around said flow passage apertures and said assembly screw bores and being convex radially outward of said flow passage apertures to effect sealing thereof within said sealing ring upon being compressed when said components are assembled, and being concave radially around said assembly screw bores.

2. A seal assembly as set forth in claim 1, wherein said sealing ring is contoured in cross section with a crest (6) which extends axially beyond at last one side surface of the carrier rings; said sealing ring having a valley inwardly of said one side, whereby upon compression of said crest the material thereof is displaced into said valley to the plane of said side surface.

3. A seal assembly as set forth in claim 2, wherein said sealing ring has a crest and a valley at the opposite side surface of said carrier rings, said crest being displaced into said valley upon compression to the plane of said opposite side surface.

4. A seal assembly comprised of a compressible sealing ring and a pair of confining rings having a convoluted radial spacing; said sealing ring being convoluted and disposed in said spacing and extending beyond the radial surfaces of said confining rings on at least one side thereof; and flow passages sealed interiorally of said sealing ring within convolutions thereof provided in the inner confining ring.

5. A seal assembly as set forth in claim 4, said sealing ring extending beyond the radial surfaces on both sides of said confining rings.

6. A seal assembly as set forth in claim 5, said sealing ring cross sections on each side of said confining rings having crests extending beyond said radial surfaces with adjoining valleys for receiving the compressed material of said crests.

7. A seal assembly as set forth in claim 5, the outer of said rings having apertures for passage therethrough of assembly screws.

8. In a radial pump, a seal assembly for sealing the registering flow passages of a pump housing and a pulsator chamber upon assembly of said components; wherein said seal assembly is interposed between opposing surfaces of said components;
the improvement which comprises:
said seal assembly being comprised of a compressible sealing ring and a pair of confining rings having a radially convoluted spacing; said sealing ring being similarly convoluted and disposed in said spacing and extending axially beyond at least one side of said rings; the inner of said confining rings having flow passages sealed interiorly of said sealing ring within convolutions thereof;

said sealing ring having a cross section on said one side of said confining rings comprising a continuously convoluted crest extending beyond said one side with an adjoining valley within the thickness of said confining rings for receiving the compressed material of said crests when said pump housing and said pulsator chamber are assembled; the outer of said confining rings having bores for passage therethrough of assembly screws exteriorly of said sealing ring whereby said pump housing and said pulsator chamber are assembled.

9. In a radial pump as set forth in claim 8, wherein said sealing ring extends axially beyond said confining rings on the opposite side thereof and having a continuous convoluted crest extending therebeyond and an adjoining valley within the thickness of said confining rings for receiving the compressed material of said crests when said pump housing and said pulsator chamber are assembled.

* * * * *